United States Patent
Yanagisawa

[11] Patent Number: 5,311,790
[45] Date of Patent: May 17, 1994

[54] DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 916,681

[22] Filed: Jul. 22, 1992

[30] Foreign Application Priority Data

Jul. 25, 1991 [JP] Japan ................. 3-208679

[51] Int. Cl.⁵ ................. G05G 11/00; B25J 11/00
[52] U.S. Cl. ................. 74/479 PH; 74/89.22; 74/89.15; 108/137; 901/16
[58] Field of Search ........ 74/479 R, 479 PF, 479 PH, 74/479 MF, 89.22, 89.15; 33/1 M; 108/20, 137, 143; 248/184, 185, 657, 661; 414/749; 901/16, 21, 23, 25

[56] References Cited

U.S. PATENT DOCUMENTS

| 831,574 | 9/1906 | Stanley | 108/137 |
| 3,517,624 | 6/1970 | Helms | 108/137 |
| 4,226,191 | 10/1980 | Espana | 108/20 |
| 4,229,641 | 10/1980 | Ihara | 901/16 X |
| 5,092,193 | 3/1992 | Yanagisawa | 74/479 PH |
| 5,165,296 | 11/1992 | Yanagisawa | 108/143 X |

FOREIGN PATENT DOCUMENTS

| 0265855 | 5/1988 | European Pat. Off. | |
| 63-191533 | 8/1988 | Japan . | |
| 1-303359 | 12/1989 | Japan | 74/479 |
| 2-134443 | 5/1990 | Japan | 74/479 |
| 2-225857 | 9/1990 | Japan | 74/479 |

*Primary Examiner*—Leslie A. Braun
*Assistant Examiner*—David W. Laub

[57] ABSTRACT

A drive system comprises a pair of racks provided in a first direction, a pair of travellers, each of which is capable of moving in the first direction alongside each rack, a connecting member provided in a second direction perpendicular to the first direction, each end of the connecting member is fixed to each traveller, a pair of pinions, each of which engages with each rack and rolls thereon in the first direction, the pinions coaxially connected by a shaft, and a first motor for driving at least one of the travellers in the first direction, wherein the first motor is not mounted on the travellers and the connecting member. With this structure, the movable parts of the drive system are lightened so that high speed operation is made possible.

17 Claims, 7 Drawing Sheets

DRIVE SYSTEM

BACKGROUND OF THE INVENTION

The present invention relates to a drive system, more precisely relates to a drive system having a rack-pinion mechanism.

Drive systems having a rack-pinion mechanism have been known. For example, European Patent Gazette EP-265-855-A disclosed a drive system having a rack-pinion mechanism. The system has a pair of pinions which are coaxially connected by a shaft. The shaft is rotatably pierced through a moving body. The pinions are respectively engaged with a pair of racks, which are provided in a first direction in parallel, and the pinions are rotated by a motor attached to the one end of the shaft. When the motor is driven, the shaft is rotated together with the pinions. Rotating pinions roll over the racks, so that the moving body moves in the first direction. In the above described drive system, since the pinions are engaged with the parallel racks and connected to the shaft, the positioning accuracy of the moving body can be quite high.

However, in the drive system, the motor moves together with the moving body, the shaft, etc., so that the weight of the motor, which is relatively quite heavy, becomes a load on the motor. The heavy load causes disadvantages such as greater energy consumption and an obstacle to high speed operation.

SUMMARY OF THE INVENTION

An object of the present invention is to provide a drive system in which the weight of the movable parts is lightened for high speed operation.

To achieve the object, the drive system of the present invention comprises a pair of racks provided in a first direction, a pair of travellers, each of which is capable of moving in the first direction alongside each rack, a connecting member provided in a second direction perpendicular to the first direction, each end of the connecting member is fixed to each traveller, a pair of pinions, each of which engages each rack and rolls thereon in the first direction, the pinions coaxially connected by a shaft, and a first driving means for driving at least one of the travellers in the first direction, wherein the first driving means is not mounted on the travellers and the connecting member.

In the drive system of the present invention, the first driving means is not mounted on the movable parts such as the travellers and the connecting member, and drives at least one of the travellers in the first direction, so that the movable parts are lightened and high speed operation is made possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawing which are given by way of illustration only, and thus are not limitative of the present invention, and in which.

DETAILED DESCRIPTION OF THE PREFERRED EMBODIMENTS

Preferred embodiments of the present invention will now be described in detail with reference to the accompanying drawings.

(First Embodiment)

Figure 1:
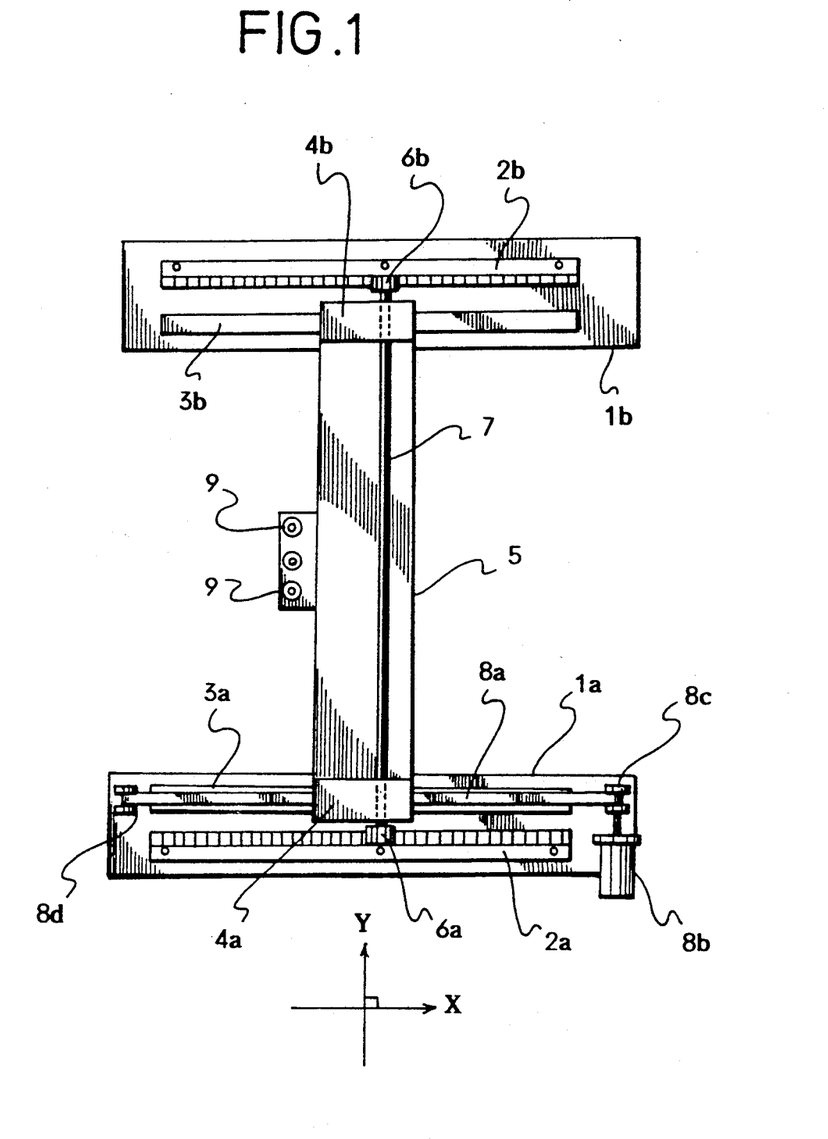
FIG. 1 is a view of a First Embodiment of the present invention.

First Embodiment will be explained with reference to FIG. 1.

Bases $1a$ and $1b$ are provided in parallel in an X-direction (a first direction) with proper separation.

Racks $2a$ and $2b$ are respectively fixed on the bases $1a$ and $1b$. The racks $2a$ and $2a$ are also provided in the X-direction.

First linear guides $3a$ and $3b$ are also respectively fixed on the bases $1a$ and $1b$. The first linear guides $3a$ and $3a$ are provided in the X-direction, parallel to the racks $2a$ and $1b$.

Travellers $4a$ and $4b$ are capable of moving in the X7 direction. The lower parts of the travellers $4a$ and $4b$ are slidably fitted on the first linear guides $3a$ and $3b$. With this structure, the travellers $4a$ and $4b$ move alongside the racks $2a$ and $1b$.

A connecting plate 5 (a connecting member) is provided in a Y-direction (a second direction) perpendicular to the X-direction. Each end of the connecting plate 5 is respectively fixed to the travellers $4a$ and $4b$. Therefore, the connecting plate 5 linearly moves in the X-direction when the travellers $4a$ and $4b$ move in the X-direction.

Pinions $6a$ and $6b$ are respectively engaged with the racks $2a$ and $2b$, and capable of rolling thereon in the X-direction. The pinions $6a$ and $6b$ are coaxially connected by a shaft 7. The shaft 7 is rotatably pierced through the travellers $4a$ and $4b$. When the travellers $4a$ and $4b$, which are connected by the connecting plate 5, move in the X-direction, the pinions $6a$ and $6b$ roll along the racks $2a$ and $2b$ with the movement thereof.

Note that, in case that the shaft 7 is long, the shaft 7 sometimes deflects during its rotation. To prevent the deflection, a pipe may be spanned between the travellers $4a$ and $4b$ and the shaft 7 may be pierced through the pipe. Moreover, lubricant, e.g. grease, may be filled in the pipe in order to prevent noise and abrasion.

A timing belt $8a$, which is a part of a first driving means, is provided in the X-direction and above the first linear guide $3a$ on the base $1a$. The timing belt $8a$ is engaged with timing pulleys $8c$ and $8d$ and driven in the X-direction. The timing belt $8a$ is connected to the traveller $4a$, so that the traveller $4a$ moves in the X-direction when the timing belt 8 is driven in the X-direction. By the movement of the traveller 4a in the X-direction, the traveller 4b is simultaneously moved, so that the pinions 6a and 6a roll in the X-direction over the racks 2a and 2b.

A servo motor 8b, which is a part of the first driving means, is fixed on the base 2a. The servo motor 8b drives the timing belt 8a in the X-direction.

Robot heads 9, tools, measuring equipment, work to be machined, etc. can be attached to the connecting plate 5, which is linearly moved.

In the drive system of the present embodiment, the connecting plate 5 can be moved to any position in the X-direction by driving the timing belt 8a with the motor 8b. By the movement of the connecting plate 5, operations with the robot heads 9, etc., which are attached to the connecting plate 5, can be executed at any position.

The motor 8b is fixed on the base 1a. In other words, the motor 8b is not mounted on the movable parts, such as the travellers 4a and 4b, the connecting plate 5, so that the total weight of the movable parts can be reduced and the high speed operation of the connecting plate 5 with the robot heads 9 can be executed. Namely, the performance of the drive system can be higher.

In the present embodiment, the belt drive mechanism including the timing belt 8a and the motor 8b is shown as the first driving means. For example, a ball screw mechanism, which will be explained in Second Embodiment, and a cylinder drive mechanism may be used instead of the belt drive mechanism.

(Second Embodiment)

Figure 2:
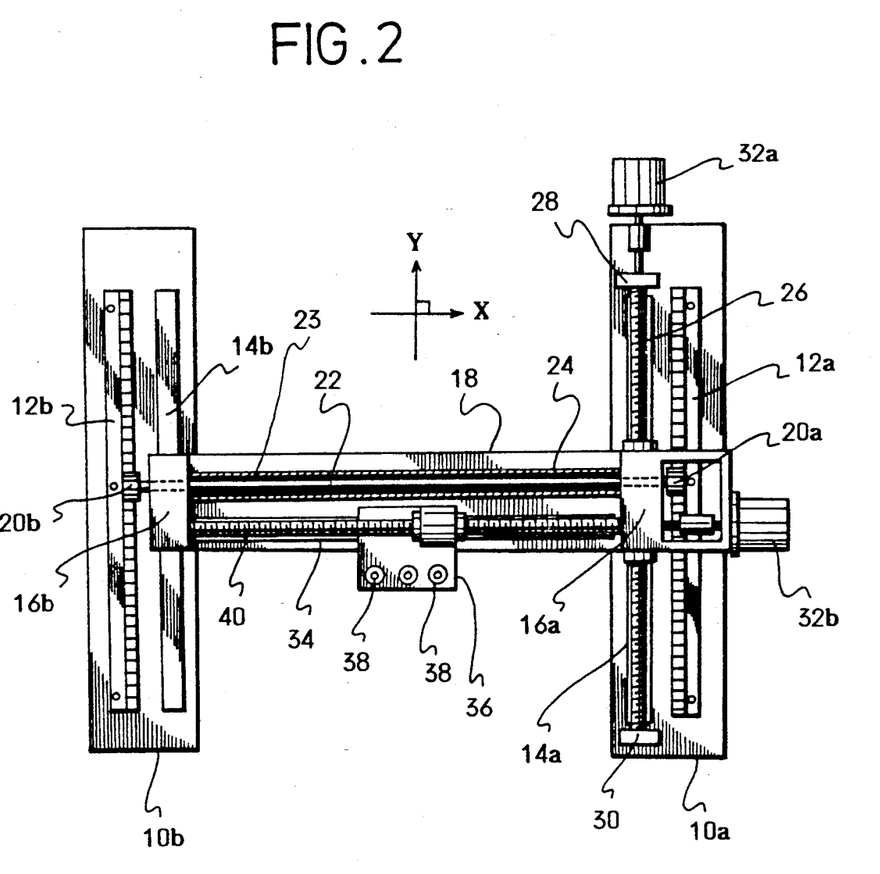
FIG. 2 is a plan view of a Second Embodiment of the present invention.

Second Embodiment will be explained with reference to FIG. 2.

Bases 10a and 10b are provided in parallel in a Y-direction (a first direction) with proper separation.

Racks 12a and 12b are respectively fixed on the bases 10a and 10b. The racks 12a and 12b are also provided in the Y-direction.

First linear guides 14a and 14b are also respectively fixed on the bases 10a and 10b. The first linear guides 14a and 14a are provided in the Y-direction, parallel to the racks 12a and 12b.

Travellers 16a and 16b are capable of moving in the Y-direction. The lower parts of the travellers 16a and 16b are slidably fitted on the first linear guides 14a and 14b. With this structure, the travellers 16a and 16b move alongside the racks 12a and 12b.

A connecting plate 18 (a connecting member) is provided in an X-direction (a second direction) perpendicular to the Y-direction. Each end of the connecting plate 18 is respectively fixed to the travellers 16a and 16b. Therefore, the connecting plate 18 linearly moves in the Y-direction when the travellers 16a and 16b move in the Y-direction.

Pinions 20a and 20b are respectively engaged with the racks 12a and 11b, and capable of rolling thereon in the Y-direction. The pinions 20a and 20b are coaxially connected by a shaft 22. The shaft 22 is rotatably pierced through a hollow pipe 24, which is spanned between the travellers 16a and 16b, and the travellers 16a and 16b. When the travellers 16a and 16b, which are connected by the connecting plate 18, move in the Y-direction, the pinions 20a and 20b roll on the racks 12a and 12b with the movement thereof.

In the present embodiment, the shaft 22 is pierced through the pipe 24, so that the deflection of the shaft 22, which is sometimes caused when the shaft 22 is long, can be prevented. If there is no possibility of the deflection, the pipe 24 may be omitted. Moreover, in the present embodiment, lubricant 23, e.g. grease, is filled into the pipe 24 in order to prevent noise and abrasion.

A first ball screw 26, which is a part of a first driving means, is provided on the base 10a and above the first linear guide 14a. The first ball screw 26 is rotatably spanned in the Y-direction between supporting members 28 and 30, which are fixed on the base 10a. The first ball screw 26 is screwed through the traveller 16a, so that the traveller 16a, which is prevented from rotation by the first linear guide 14a, moves in the Y-direction when the first ball screw 26 turns on its axis. By the movement of the traveller 16a in the Y-direction, the traveller 16b is simultaneously moved, so that the pinions 20a and 20b roll in the Y-direction over the racks 12a and 12b.

A servo motor 32a, which is a part of the first driving means, is fixed on the base 10a. The servo motor 32a turns the first ball screw 26 its axis.

A second linear guide 34 is fixed on the connecting plate 18. The second linear guide 34 is provided in the X-direction.

A moving body 36 is capable of moving in the X-direction. The lower part of the moving body 36 is slidably fitted on the second linear guide 34. By the combination of the movement of the connecting plate 18 in the Y-direction and the movement of the moving body 36 in the X-direction, the moving body 36 is capable of two dimensional movement in the X- and Y-directions.

Robot heads 38, tools, measuring equipment, work to be machined, etc. can be attached on the moving body 36, which is capable of two dimensional movement.

A second ball screw 40, which is a part of a second driving means, is rotatably spanned between the travellers 16a and 16b. The second ball screw 40 is provided in the X-direction and above the second linear guide 34. The second ball screw 40 is screwed through the moving body 36, so that the moving body 36, which is prevented from rotation by the second linear guide 34, moves in the X-direction when the second ball screw 40 turns on its axis.

A servo motor 32b, which is a part of the second driving means, is fixed on the traveller 16a. The servo motor 32b drives the second ball screw 40 to turn on its axis.

In the drive system of the present embodiment, the moving body 36 can be moved to any positions in the X- and Y-directions by driving the first ball screw 26 and the second ball screw 40 with the motors 32a and 31b. By the movement of the moving body 36, operations with the robot heads 38, etc., which are attached to the moving body 36, can be executed at any two dimensional position.

The motor 32a is fixed on the base 10a. In other words, the motor 32a is not mounted on the movable parts, such as the travellers 16a and 16b, the connecting plate 18, the moving body 36, so that the total weight of the movable parts is lightened and the high speed operation of the moving body 36 with the robot heads 38 can be executed. Namely, the performance of the drive system is greater.

The position of the moving body 36 is determined by not only the racks 12a and 12b and the pinions 20a and 20b but also the first ball screw 26 and the second ball screw 40, so that the positioning accuracy thereof can be higher.

In the present embodiment, the ball screw mechanism including the first ball screw 26, the second ball screw 40, the servo motors 32a and 32b are shown as the first and the second driving means. The belt drive mechanism, which has been explained in First Embodiment, and a cylinder drive mechanism may be used instead of the ball screw mechanism.

(Third Embodiment)

Third Embodiment will be explained with reference to FIGS. 3 and 4.

Figure 3:
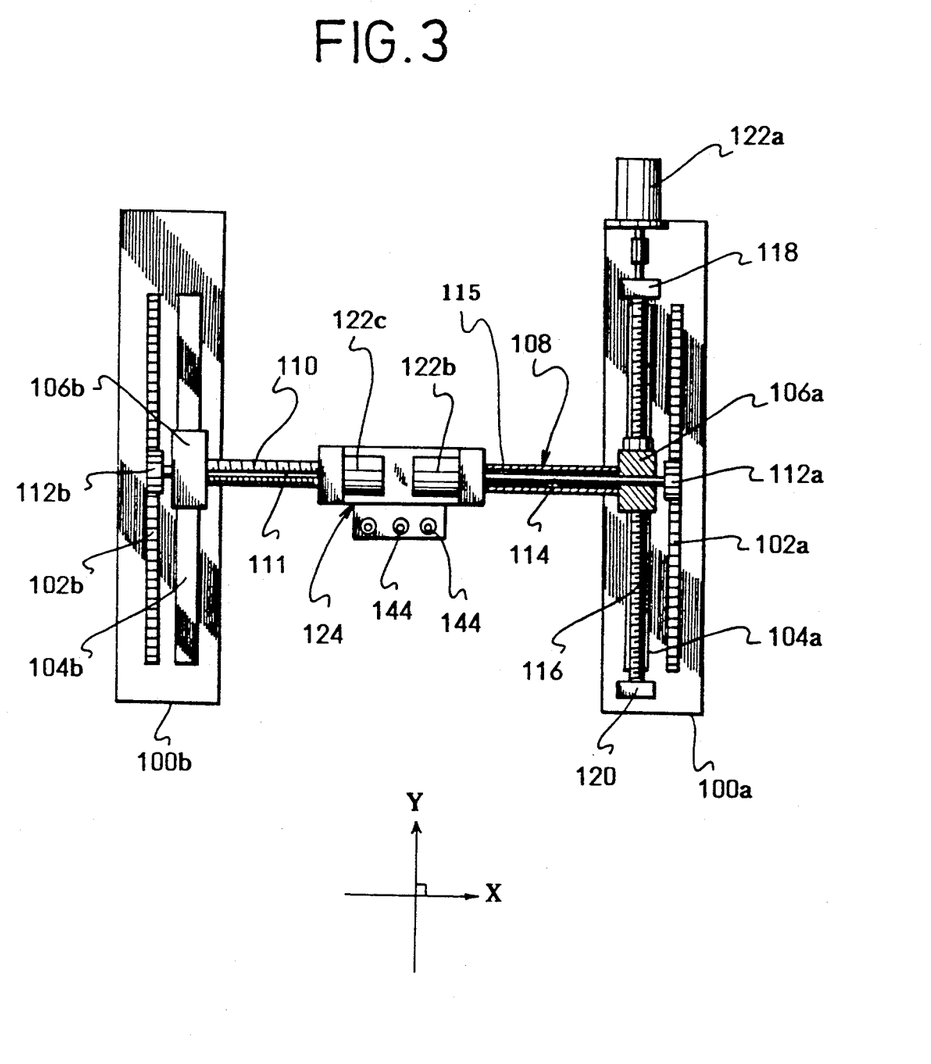
FIG. 3 is a plan view of a Third Embodiment of the present invention.

In FIG. 3, bases 100a and 100b are provided in parallel in a Y-direction (a first direction) with proper separation.

Racks 102a and 102b are respectively fixed on the bases 100a and 100b. The racks 102a and 102a are also provided in the Y-direction.

First linear guides 104a and 104b are also respectively fixed on the bases 100a and 100b. The first linear guides 104a and 104a are provided in the Y-direction, parallel to the racks 102a and 102b.

Travellers 106a and 106b are capable of moving in the Y-direction. The lower parts of the travellers 106a and 106b are slidably fitted on the first linear guides 104a and 104b. With this structure, the travellers 106a and 106b move alongside the racks 102a and 102b.

A hollow main shaft 108 (a connecting member) is provided in an X-direction (a second direction) perpendicular to the Y-direction. Each end of the main shaft 108 is respectively fixed to the travellers 106a and 106b. There is grooved a male screw section on the outer circumferential face of the main shaft 108. Furthermore, there are grooved linear spline grooves 111 in the axial direction on the outer circumferential face of the main shaft 108.

Pinions 112a and 112b are respectively engaged with the racks 102a and 101b, and capable of rolling thereon in the Y-direction. The pinions 112a and 112b are coaxially connected by a shaft 114. The shaft 114 is rotatably pierced through the hollow main shaft 108, which is spanned between the travellers 106a and 106b, and the travellers 106a and 106b. When the travellers 106a and 106b, which are connected by the main shaft 108, move in the Y-direction, the pinions 112a and 112b roll over the racks 102a and 102b with the movement thereof.

In the present embodiment, the shaft 114 is pierced through the main shaft 108, so that the deflection of the shaft 114, which is sometimes caused when the shaft 114 is long, can be prevented. Moreover, in the present embodiment, lubricant 115, e.g. grease, is filled into the main shaft 108 in order to prevent noise and abrasion. Note that if there is no possibility of the deflection, the shaft 114 may be provided outside of the main shaft 108.

A ball screw 116, which is a part of a first driving means, is provided on the base 100a and above the first linear guide 104a. The ball screw 116 is rotatably spanned in the Y-direction between supporting members 118 and 120, which are fixed on the base 100a. The ball screw 116 is screwed through the traveller 106a, so that the traveller 106a, which is prevented from rotation by the first linear guide 104a, moves in the Y-direction when the ball screw 116 turns on its axis. By the movement of the traveller 106a in the Y-direction, the traveller 106b is simultaneously moved, so that the pinions 112a and 112b roll in the Y-direction along the racks 102a and 102b.

A servo motor 122a, which is a part of the first driving means, is fixed on the base 100a. The servo motor 122a drives the ball screw 116 to turn on its axis.

A moving body 124 is provided on the main shaft 108 and capable of moving in the X-direction. The structure of the moving body 124 will be explained with reference to FIG. 4.

Figure 4:
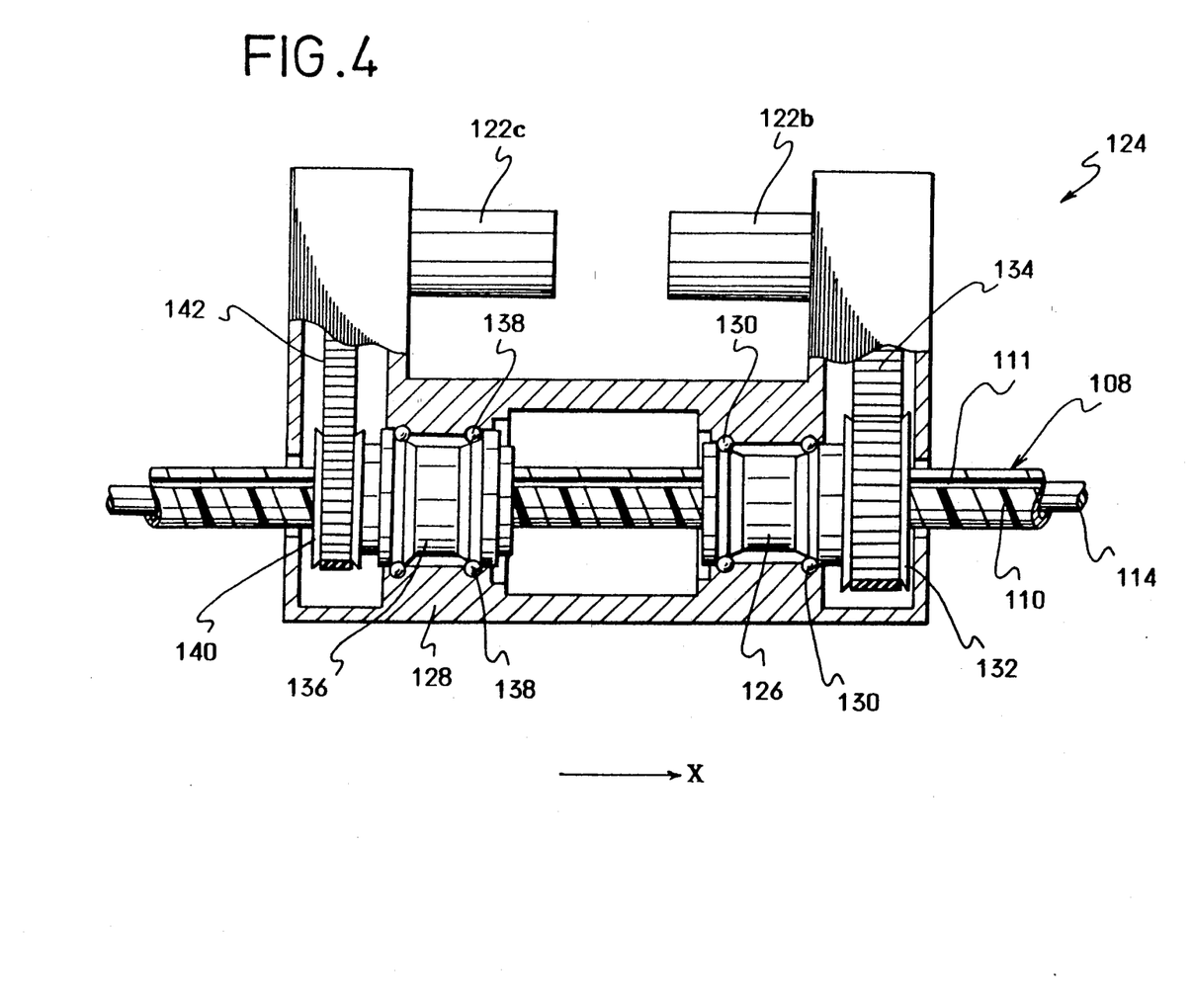
FIG. 4 is a partial sectional view of a moving body of Third Embodiment.

In FIG. 4, a rotary nut 126 is rotatably provided in a housing 128 of the moving body 124. The male groove section 110 of the main shaft 108 is screwed through the rotary nut 126 with many metal balls (not shown). There are provided balls 130 between the outer circumferential face of the rotary nut 126 and the inner face of the housing 128 so as to form a ball bearing surface. There is fixed a timing pulley 132 on the outer end face of the rotary nut 126, so that rotary torque of a servo motor 121b, which is mounted on the moving body 124, is transmitted to the timing pulley 132 and the rotary nut 126 via a timing belt 134.

A rotary drum 136 is rotatably provided in a housing 128 of the moving body 124. The rotary drum 136 covers the main shaft 108. There are formed projected lines (not shown), which engage with the spline grooves 111 of the main shaft 108, on the inner face of the rotary drum 136. There are provided balls 138 between the outer circumferential face of the rotary drum 136 and the inner face of the housing 128 so as to form a ball bearing surface. There is fixed a timing pulley 140 on the outer end face of the rotary drum 136, so that rotary torque of a servo motor 122c, which is mounted on the moving body 124, is transmitted to the timing pulley 140 and the rotary drum 136 via a timing belt 142.

In the present embodiment, each end of the main shaft 108 is respectively fixed to the travellers 106a and 106b, so that the main shaft 108 is unable to rotate on its axis. By this fixation, the moving body 124 is capable of linearly moving alongside the main shaft 108 in the X-direction and rotating thereon. Namely, when only the rotary nut 126 rotates, the moving body 124 linearly moves alongside the main shaft 108; when the rotary nut 126 and the rotary drum 128 rotate, the moving body rotates on the main shaft 108. Note that, the mechanism transmitting the rotary torque of the motor 122b to the rotary nut 126 is a second driving means.

In the drive system of the present embodiment, the moving body 124 can be moved to any position in the X- and Y-directions by driving the ball screw 116 and the rotary nut 126 with the motors 122a and 122b. By the movement of the moving body 124, operations with the robot heads 144, etc., which are attached to the moving body 124, can be executed at any two dimensional position.

During the operation, the position of the moving body 124 is determined by not only the racks 102a and 102b and the pinions 112a and 112b but also the ball screw 116 and the ball screw mechanism including the main shaft 108 and the rotary nut 126, so that the positioning accuracy thereof can be greater.

Furthermore, since the moving body 124 is capable of rotating on the main shaft 108, the operation angle of the robot heads 144, etc. can be changed. Note that, if no rotation of the moving body 124 is required, the spline grooves 111 of the main shaft 108, the rotary drum 136, the motor 122c, etc. may be omitted. However, in this case, a means for preventing the rotation of the moving body 124 is required.

In this embodiment, as well as the former embodiments, the motor 122a is fixed on the base 100a. In other words, the motor 122a is not mounted on the movable parts, such as the travellers 106a and 106b, the main shaft 108, or the moving body 124, so that the total weight of the movable parts is lightened and high speed operation of the moving body 124 with the robot heads 144 can be executed. Namely, the performance of the drive system can be higher.

In the present embodiment, the rotary nut 126 and the rotary drum 136 are respectively driven by the motors 122b and 122c. If the rotary nut 126 and the rotary drum 136 are driven by one motor with a clutch, the weight of the movable parts can be lighter.

If the rotation angle of the moving body 124 with respect to the main shaft 108 is small, a mechanism including a cylinder unit and links may be used instead of the motor 122c.

In the present embodiment, one moving body 124 is provided on the main shaft 108 but a plurality of moving bodies may be provided on one main shaft.

In the present embodiment, too, the first driving means may be a belt drive mechanism, a cylinder drive mechanism, etc. instead of the ball screw mechanism.

(Fourth Embodiment)

Figure 5:
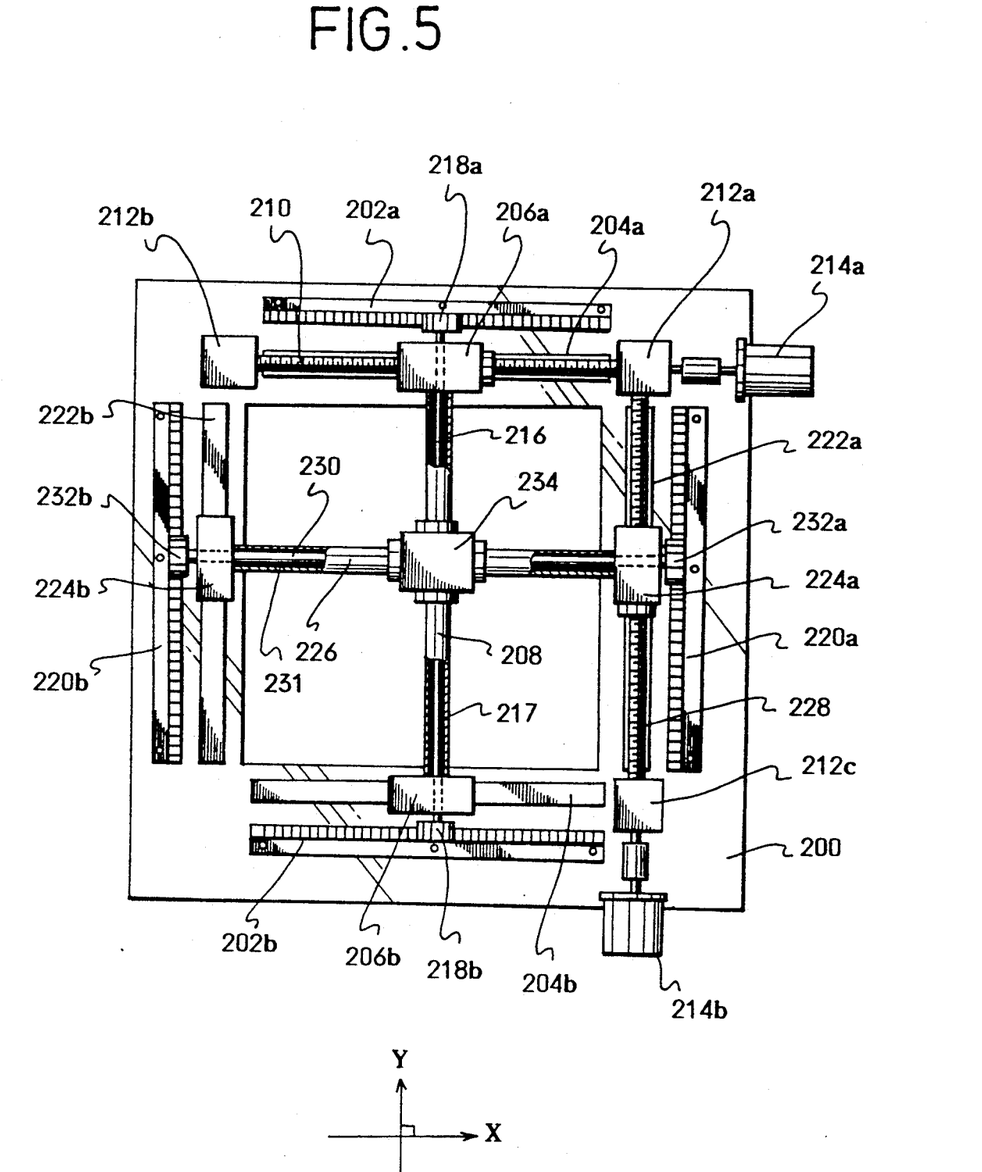
FIG. 5 is a plan view of a Fourth Embodiment of the present invention.

Fourth Embodiment will be explained with reference to FIG. 5.

First, a drive mechanism in an X-direction (a first direction) will be explained.

A base 200 is a rectangular frame having a center space.

First racks 202a and 202b fixed on the base 200. The first racks 202a and 202b are provided in the X-direction.

First linear guides 204a and 204b are fixed on the base 200 in the X-direction. The first linear guides 204a and 204b are provided inside of the first racks 202a and 202b.

First travellers 206a and 206b are slidably fitted on the first linear guides 204a and 204b.

A first connecting member 208 is a hollow pipe and both ends are respectively connected to the first travellers 206a and 206b.

A first ball screw 210, which is a part of a first driving means, is provided on the base 200 in the X-direction. The first ball screw 210 is rotatably supported above the first linear guide 204a by gear boxes 212a and 211b. The first ball screw 210 is screwed through the first traveller 206a. When the first ball screw 210 turns on its axis, the first travellers 206a and 206b, which are connected by the connecting member 208, move on the first linear guides 204a and 204b in the X-direction.

A servo motor 214a, which is a part of a first driving means, for driving the first ball screw 210 is fixed on the base 200. Rotation speed, rotational direction, etc. of the motor 214a is controlled to control the rotation of the first ball screw 210. The servo motor 214a has a lock mechanism (not shown), which is capable of holding the present rotational position of the first ball screw 210 when the ball screw 210 stops rotating.

A first shaft 216 is rotatably pierced through the first connecting member 208, and the first travellers 206a and 206b. There are fixed first pinions 218a and 218b at till both ends of the first shaft 216, which are projected from the first travellers 206a and 206b. The first pinions 218a and 218b are respectively engaged with the first racks 202a and 201b. In the present embodiment, lubricant 217, e.g. grease, is filled into the first connecting member 208 in order to prevent noise and abrasion caused between the first connecting member 208 and the first shaft 216. Note that, if the first connecting member 208 is omitted, the first shaft 216 also serves as the first connecting member.

Successively, a drive mechanism in an Y-direction (a first direction) will be explained.

Second racks 220a and 220b fixed on the base 200. The second racks 220a and 220b are provided in the Y-direction.

Second linear guides 222a and 222b are fixed on the base 200 in the Y-direction. The second linear guides 222a and 222b are provided inside of the second racks 220a and 220b.

Second travellers 224a and 224b are slidably fitted on the second linear guides 222a and 222b.

A second connecting member 226 is a hollow pipe and both ends are respectively connected to the second travellers 224a and 224b.

A second ball screw 228, which is a part of a second driving means, is provided on the base 200 in the Y-direction. The second ball screw 228 is rotatably supported above the second linear guide 222a by gear boxes 212a and 212c. The second ball screw 228 is screwed through the second traveller 224a. When the second ball screw 228 turns on its axis, the second travellers 224a and 224b, which are connected by the connecting member 226, move on the second linear guides 222a and 222b in the Y-direction.

A servo motor 214b, which is a part of a second driving means, for driving the second ball screw 228 is fixed on the base 200. Rotation speed, rotational direction, etc. of the motor 214b is controlled to control the rotation of the second ball screw 228. The servo motor 214b has a lock mechanism (not shown) which is capable of holding the present rotational position of the second ball screw 228 when the ball screw 228 stops its rotation.

A second shaft 230 is rotatably pierced through the second connecting member 226, and the second travellers 224a and 224b. There are fixed second pinions 232a and 232b at both ends of the second shaft 230, which are projected from the second travellers 224a and 224b. The second pinions 232a and 232b are respectively engaged with the second racks 220a and 220b. In the present embodiment, lubricant 231, e.g. grease, is filled into the second connecting member 226, too, in order to prevent noise and abrasion caused between the second connecting member 226 and the second shaft 230. Note that, if the second connecting member 226 is omitted, the second shaft 230 also serves as the second connecting member.

A moving body 234 is movably provided on the first connecting member 208 and the second connecting member 226. Namely, the first connecting member 208 and the second connecting member 226 are pierced through the moving body 234. When the motors 214a and/or 214b are driven, the moving body 234 is moved in the X- and Y-directions within the space defined by the base 200. In the present embodiment, no motor is mounted on the moving body 234, so that the load on the motors 214a and 214b can be quite small and the higher speed operation of the moving body 234 with the robot heads, etc. (not shown) can be executed. Namely, the performance of the drive system can be quite high.

During the operation, the position of the moving body 234 is determined by not only the racks 202a, 201b, 220a and 220b, the pinions 218a, 218b, 232a and 232b but also the ball screws 210 and 228, so that the positioning accuracy thereof can be higher.

In the present embodiment, too, the first and the second driving means may be a belt drive mechanism, a cylinder drive mechanism, etc. instead of the ball screw mechanism.

(Fifth Embodiment)

Figure 6:
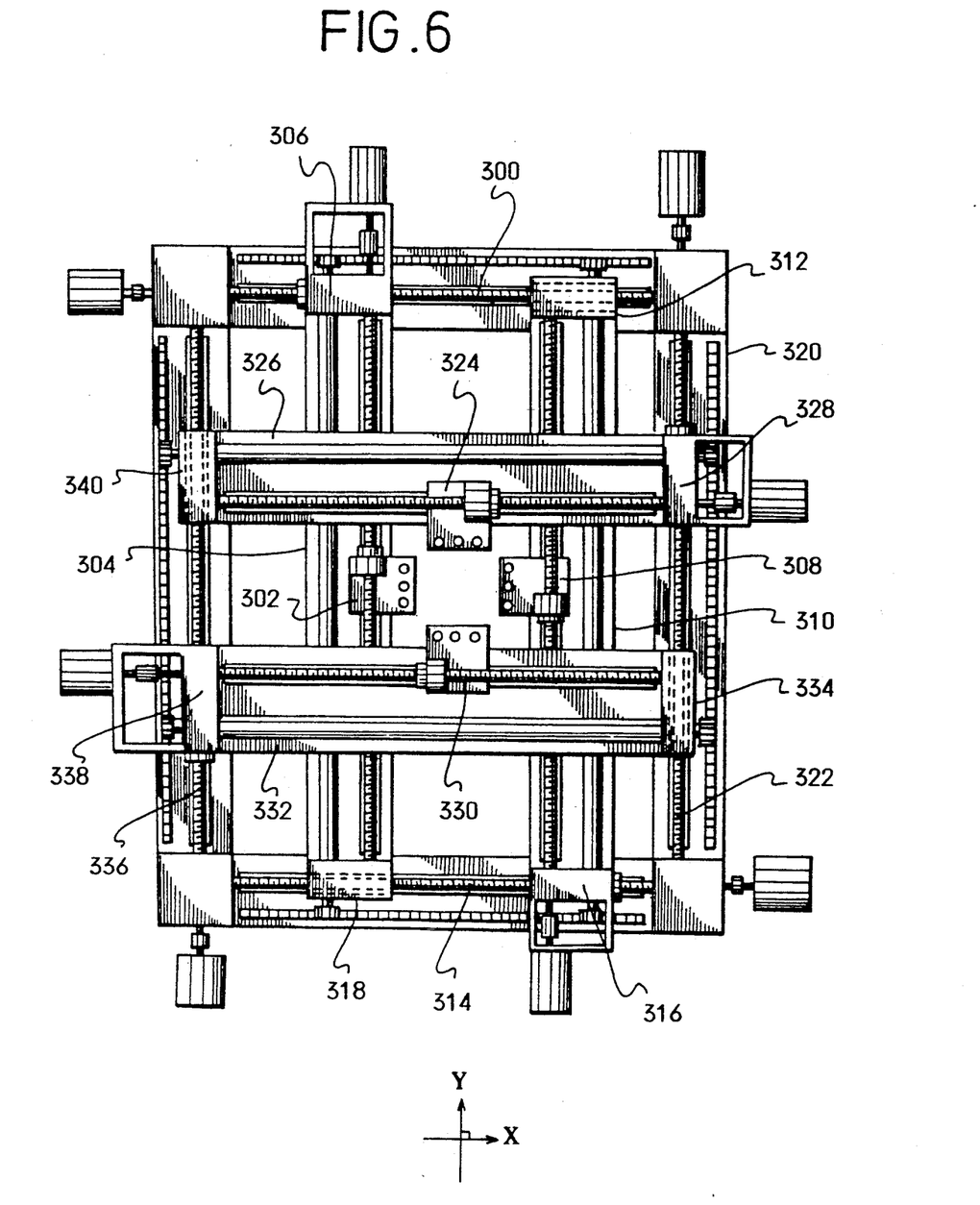
FIG. 6 is a plane view of a Fifth Embodiment of the present invention.

Fifth Embodiment will be explained with reference to FIG. 6.

A drive system of Fifth Embodiment is a combination of the systems of the Second Embodiment, which are set on a base 320.

A ball screw 300 is screwed through a traveller 306, which has a connecting plate 304 on which a moving body 302 is mounted move in an X-direction. The ball screw 300 is loosely pierced through a traveller 312, which has a connecting plate 310 on which a moving body 308 is mounted movably in the X-direction. A ball screw 314 is screwed through a traveller 316, which has the connecting plate 310 on which the moving body 308 is mounted move in the X-direction. The ball screw 314 is loosely pierced through a traveller 318, which has the connecting plate 304 on which the moving body 302 is mounted movably in the X-direction. Therefore, the movement of the moving bodies 302 and 308 in the X-direction can be controlled independently.

On the other hand, a ball screw 322 is screwed through a traveller 328, which has a connecting plate 326 on which a moving body 324 is mounted movably in a X-direction. The ball screw 322 is loosely pierced through a traveller 334, which has a connecting plate 332 on which a moving body 330 is mounted movably in the X-direction. A ball screw 336 is screwed through a traveller 338, which has the connecting plate 332 on which the moving body 330 is mounted movably in the Y-direction. The ball screw 336 is loosely pierced through a traveller 340, which has the connecting plate 326 on which the moving body 324 is mounted movably in the Y-direction. Therefore, the movement of the moving bodies 324 and 330 in the X-direction can be controlled independently.

With the above described structure, four moving bodies 302, 308, 324 and 330 can be independently moved in the X- and Y-directions.

(Sixth Embodiment)

Figure 7:
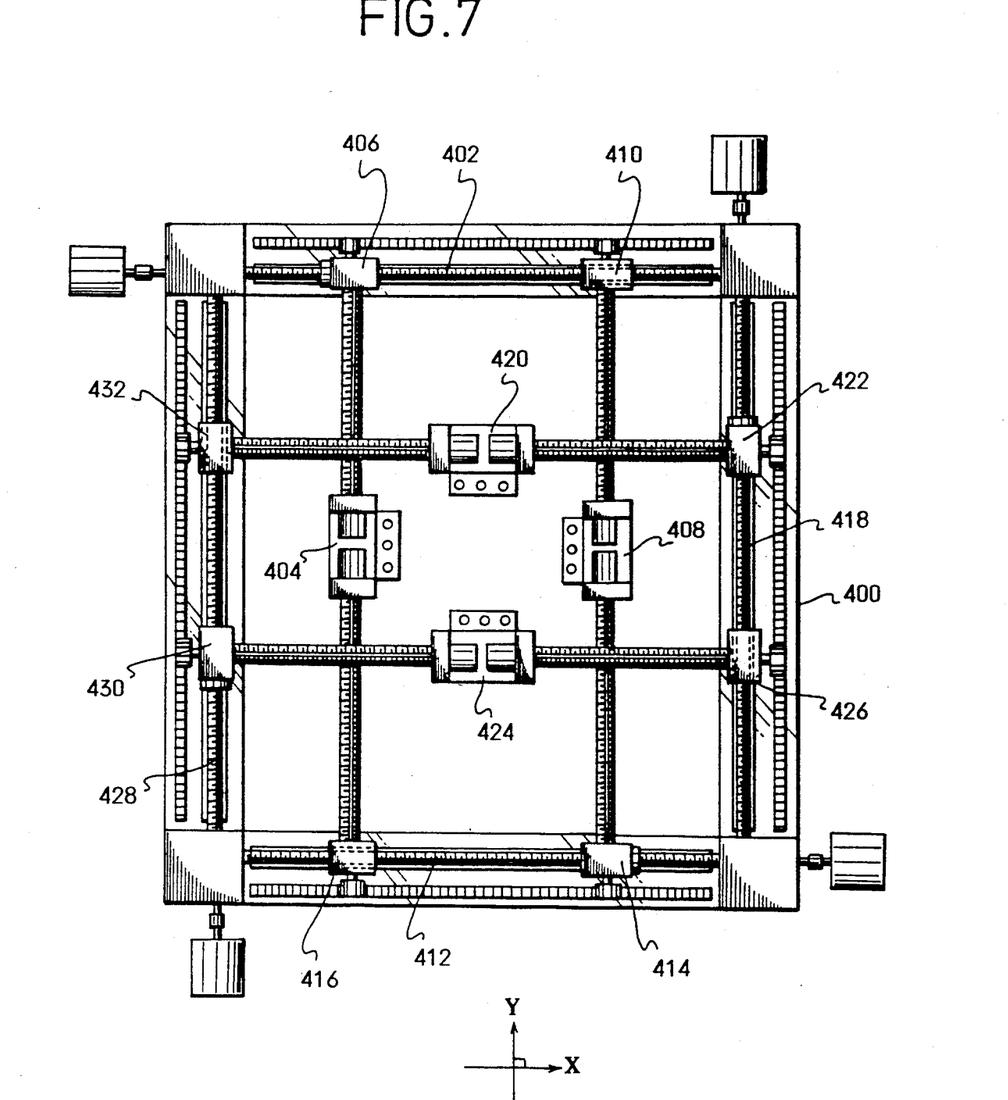
FIG. 7 is a plan view of a Sixth Embodiment of the present invention.

Sixth Embodiment will be explained with reference to FIG. 7.

A drive system of Sixth Embodiment is a combination of the systems of the Third Embodiment, which are set on a base 400.

A ball screw 402 is screwed through a traveller 406, CA which has a moving body 404 move in an X-direction. The ball screw 402 is loosely pierced through a traveller 410, which has a moving body 408 move in the X-direction. A ball screw 412 is screwed through a traveller 414, which has the moving body 408 move in the X-direction. The ball screw 412 is loosely pierced through a traveller 416, which has the moving body 404 move in the X-direction. Therefore, the movement of the moving bodies 404 and 408 in the X-direction can be controlled independently.

On the other hand, a ball screw 418 is screwed through a traveller 422, which has a moving body 420 move in a Y-direction. The ball screw 418 is loosely pierced through a traveller 426, which has a moving body 424 move in the Y-direction. A ball screw 428 is screwed through a traveller 430, which has the moving body 424 move in the Y-direction. The ball screw 428 is loosely pierced through a traveller 432, which has the moving body 420 move in the Y-direction. Therefore, the movement of the moving bodies 420 and 424 in the Y-direction can be controlled independently.

With the above described structure, four moving bodies 404, 408, 420 and 424 can be independently moved in the X- and Y-directions.

Preferred embodiments of the present invention have been described above. However, the present invention is not limited to the above described embodiments and modification can be allowed without deviating from the scope of the invention.

What is claimed is:

1. A drive system, comprising:
   a base;
   a pair of racks provided in a first direction on the base;
   a connecting member having two ends, the connecting member being provided in a second direction generally perpendicular to the first direction, each end of said connecting member being fixed to each said traveller;
   a pair of pinions, each of which engages with said rack and rolls thereon in the first detection, and pinions being coaxially connected by a shaft; and
   first driving means for driving at least one of said travellers in the first direction, said first driving means being mounted on the base separate from said travellers and said connecting member.

2. The drive system according to claim 1, further comprising:
   a pair of linear guides for guiding said travellers in the first direction, each of said linear guides being provided alongside each said rack.

3. The drive system according to claim 1, further comprising:
   a moving body movably provided on said connecting member, said moving body being movable in the second direction; and
   second driving means for driving said moving body in the second direction.

4. The drive system according to claim 3, further comprising:
   a pair of first linear guides for guiding said travellers in the first direction, each of said first linear guides being provided alongside each said rack.

5. The drive system according to claim 3, further comprising:
   a second linear guide for guiding said moving body in the second direction, said second linear guide being provided on said connecting member.

6. The drive system according to claim 3, further comprising:
   a pair of first linear guides for guiding said travellers in the first direction, each of said first linear guides being provided alongside each said rack; and
   a second linear guide for guiding said moving body in the second direction, said second linear guide being provided on said connecting member.

7. The drive system according to claim 3, wherein,
   said connecting member is a main shaft having a male screw section on the outer circumferential face, and
   said second driving means comprises:

a rotary nut rotatably provided in said moving body, said rotary nut being screwed on the male screw section of said main shaft; and a motor for rotating said rotary nut.

8. The drive system according to claim 7, further comprising:

a pair of linear guides for guiding said travellers in the first direction, each of said linear guides being provided alongside each said rack.

9. The drive system according to claim 7, wherein said main shaft is a hollow pipe, and said shaft connecting said pinions is pierced through said main shaft.

10. The drive system according to claim 7, wherein, said main shaft further has a spline groove, which is formed in the axial direction thereof, on the outer circumferential face, said second driving means further comprises a rotary drum rotatably provided in said moving body, said rotary drum is engaged with the spline groove of said main shaft, and said motor is capable of selectively rotating said rotary nut and said rotary drum.

11. The drive system according to claim 10, further comprising:

a pair of linear guides for guiding said travellers in the first direction, each of said linear guides being provided alongside each said rack.

12. The drive system according to claim 10, wherein said main shaft is a hollow pipe, and said shaft connecting said pinions is pierced through said main shaft.

13. A drive system, comprising:

a base;

a pair of first racks provided in a first direction on the base;

a pair of second racks provided in a second direction generally perpendicular to the first direction on the base;

a pair of first travellers, each of which is movable in the first direction alongside each said first rack;

a pair of second travellers, each of which is movable in the second direction alongside each said second rack;

a first connecting member having two ends, the first connecting member being provided in the second direction, each end of said first connecting member being fixed to each said second traveller;

a second connecting member having two ends, the second connecting member being provided in the first direction, each end of said second connecting member being fixed to each said second first traveller;

a pair of first pinions, each of which engages with said each first rack and rolls thereon in the first direction, said first pinions being coaxially connected by a first shaft;

a pair of second pinions, each of which engages with each said second rack and rolls thereon in the second direction, said second pinions being coaxially connected by a second shaft;

first driving means for driving at least one of said first travellers in the first direction, said first driving means being mounted on the base separate from said first travellers and said first connecting member;

second driving means for driving at least one of said second travellers in the second direction, said second driving means being mounted on the base separate from said second travellers and said second connecting member; and a moving body movably provided on said first connecting member and said second connecting member, whereby said moving body is movable in the first direction and the second direction.

14. The drive system according to claim 13, wherein said first connecting member is a hollow pipe and said first shaft connecting said first pinions is pierced through said first connecting member, and said second connecting member is a hollow pipe and said second shaft connecting said second pinions is pierced through said second connecting member.

15. The drive system according to claim 13, further comprising:

a pair of first linear guides for guiding said first travellers in the first direction, each of said first linear guides being provided alongside each said first rack.

16. The drive system according to claim 13, further comprising:

a pair of second linear guides for guiding said second travellers in the second direction, each of said second linear guides being provided alongside each said second rack.

17. The drive system according to claim 13, further comprising:

a pair of first linear guides for guiding said first travellers in the first direction, each of said first linear guides being provided alongside each said first rack; and a pair of second linear guides for guiding said second travellers in the second direction, each of said second linear guides being provided alongside each said second rack.

* * * * *